United States Patent [19]

Sale

[11] Patent Number: 5,202,627
[45] Date of Patent: Apr. 13, 1993

[54] PEDALING MONITOR FOR DISPLAYING INSTANTANEOUS PEDAL VELOCITY AND POSITION

[76] Inventor: Darryl L. Sale, 3909 W. Denver St., Chandler, Ariz. 85226

[21] Appl. No.: 716,217

[22] Filed: Jun. 17, 1991

[51] Int. Cl.⁵ .......................... G01P 3/48; G01P 3/36; A63B 21/00; A63B 23/04

[52] U.S. Cl. .................................. 324/166; 324/175; 482/8; 482/902

[58] Field of Search ....................... 324/160, 166, 175; 250/231.13, 231.14, 231.16; 73/379; 482/8, 57, 901–903

[56] References Cited

U.S. PATENT DOCUMENTS 5,031,455  7/1991  Cline ..................................... 73/379

*Primary Examiner*—Walter E. Snow
*Attorney, Agent, or Firm*—Bradley J. Botsch, Sr.

[57] ABSTRACT

A circuit for producing a display indicative of a bicycle rider's pedaling technique. The circuit measures the time required for the pedals to move through a given angle of rotation. The circuit then calculates the relative pedal velocity over the angle of rotation. This process is repeated over an entire circle of rotation to determine the variations in pedal velocity as the pedal moves through a full circle. Since the pedal velocity is related to the pedaling force applied by the rider, the variations in pedaling force can be determined. Further, the circuit has a display unit which shows a rotating line of varying length to indicate the pedaling force applied as the pedals move respectively through a full circle.

6 Claims, 4 Drawing Sheets

PEDALING MONITOR FOR DISPLAYING INSTANTANEOUS PEDAL VELOCITY AND POSITION

BACKGROUND OF THE INVENTION

The present invention relates to bicycles, for example, a pedaling technique monitor for a bicycle.

Pedaling proficiency of a bicycle rider refers to the ability of the rider to apply a constant force to each pedal throughout an entire pedaling revolution. There are at least two methods typically employed to enable a bicycle rider to improve his pedaling ability. The first method entails a rider to simply concentrate on his pedaling technique while riding. However, since this method is subjective and does not reliably compare the rider's ability at different distinct times, the pedaling ability of a rider is increased typically only when the rider believes that it is increased.

A second method typically used to improve a rider's pedaling technique is roller riding. This method includes riding on hard, smooth rollers that usually possess low rolling friction. Any aberrations in pedaling technique become apparent because they cause the rider to swerve left and right while pedaling. This swerving does provide an indication of how proficient the rider is pedaling while roller riding. However, a major limitation of roller riding is the absence of actual riding conditions. Although the rider may become proficient at roller riding after a significant amount of time, the rider must still learn how to overcome actual riding conditions such as terrain irregularities and opposing winds. These conditions require the rider to exert more force to maintain his velocity as compared to roller riding. Further, it is under these conditions that the rider's pedaling technique changes. Thus, the skills acquired during roller riding are of limited utility since they were developed under artificial conditions.

Hence, a need exists for a device that measures a rider's pedaling technique under actual riding conditions.

SUMMARY OF THE INVENTION

Briefly, there is provided a circuit comprising an optical encoder for providing first and second output signals, the first and second output signals having a predetermined frequency which is a function of an angular velocity of the optical encoder; a computing unit responsive to the first and second output signals of the optical encoder for providing first and second digital words, the first digital word being a function of a normalized angular velocity of the optical encoder, the second digital word being a function of an angular position of the optical encoder corresponding to the normalized angular velocity; and a display unit responsive to the first and second digital words of the computing unit for displaying the normalized angular velocity of the optical encoder with respect to the corresponding angular position of the optical encoder.

It is an advantage of the present invention to provide a bicycle computer for monitoring the pedaling technique of a rider while under actual riding conditions.

The above and other features and advantages of the present invention will be better understood from the following detailed description taken in conjunction with the accompanying drawings.

DETAILED DESCRIPTION OF THE DRAWINGS

Figure 1:
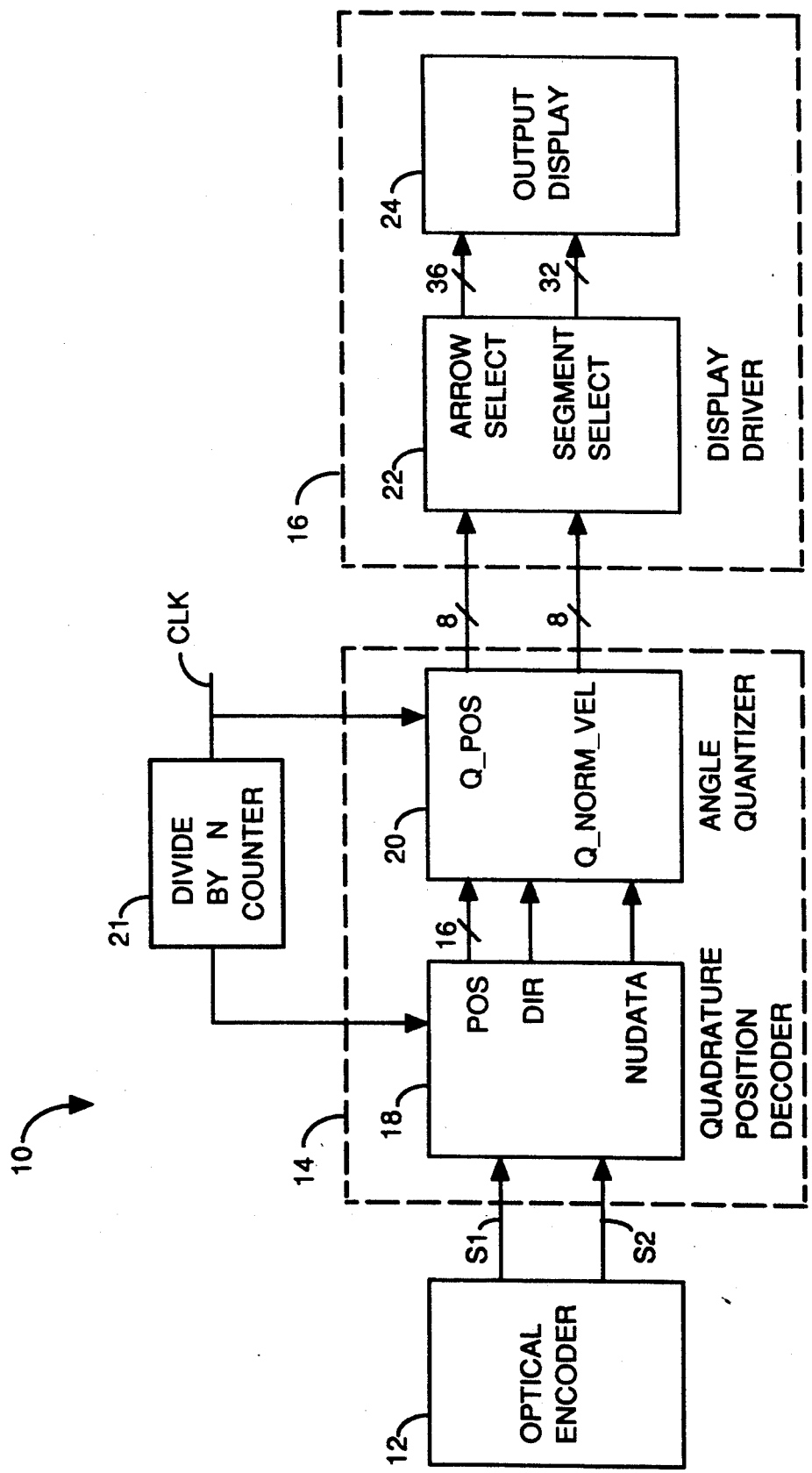
FIG. 1 is a block diagram illustrating a pedaling technique monitor in accordance with the present invention.

Referring to FIG. 1, a block diagram illustrating pedaling technique monitor 10 is shown comprising optical encoder 12 having first and second outputs respectively coupled to first and second inputs of computing unit 14. Computing unit 14 has a plurality of outputs respectively coupled to a plurality of inputs of display unit 16.

Computing unit 14 includes quadrature position decoder 18 having first and second inputs respectively coupled to the first and second inputs of computing unit 14. Quadrature position decoder 18 also has a plurality of outputs respectively coupled to a plurality of inputs of angle quantizer 20. Further, angle quantizer 20 has a plurality of outputs respectively coupled to the plurality of outputs of computing unit 14.

Computing unit 14 is responsive to clock signal CLK wherein signal CLK is applied to angle quantizer 20. Also, signal CLK is applied to quadrature position decoder 18 via divide by N counter 21.

Display unit 16 includes display driver 22 having a plurality of inputs respectively coupled to the plurality of inputs of display unit 16. Display driver 22 also has a plurality of outputs respectively coupled to a plurality of inputs of output display 24.

Briefly, in operation, optical encoder 12 is mounted to a crank spindle of a bicycle. As a rider pedals, optical encoder 12 provides a plurality of signals which are indicative of the angular velocity of the crank spindle. The plurality of signals from optical encoder 12 are decoded and converted into a vector having a position component and a relative velocity magnitude component by computing unit 14. The vector information is then received by display unit 16 where it is easily interpreted by the rider.

Figure 2:
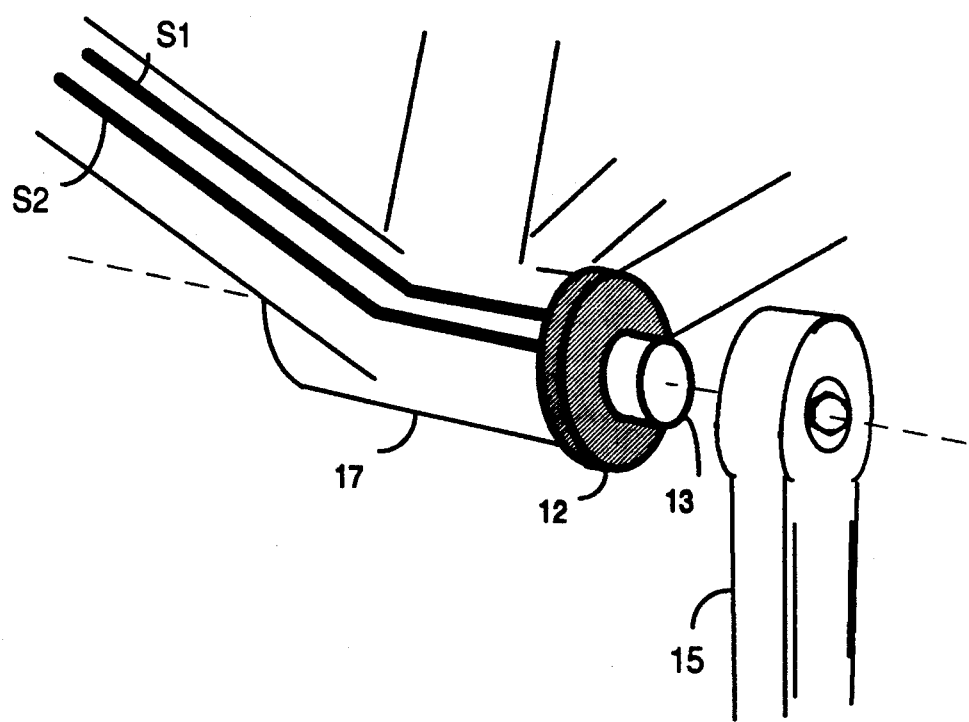
FIG. 2 is a pictorial diagram illustrating one implementation of mounting an optical encoder to a spindle of a bicycle.

In particular, optical encoder 12 typically mounts to crank spindle 13 of a bicycle as illustrated in FIG. 2 whereby crank arm 15 and bottom bracket assembly 17 are also shown. It is understood that as crank arm 15 rotates, crank spindle 13 and a portion of optical encoder 12 also rotate in conjunction. Thus, as crank arm 15 rotates, typically from a cyclist pedaling the bicycle, a portion of optical encoder 12 also rotates and provides signals S1 and S2, respectively, at first and second outputs of optical encoder 12.

Signals S1 and S2 are square wave signals of substantially equal frequency and typically having a fifty percent duty cycle. Further, the relative phase of the signals S1 and S2 indicates the direction of rotation of optical encoder 12. For example, if optical encoder 12 is rotating in a clockwise manner, signal S1 would lead signal S2 by a predetermined fraction of the total period of signal S1, say one-fourth of the total period. On the other hand, if optical encoder 12 is rotating in a counter-clockwise manner, signal S2 would lead signal S1 by a predetermined fraction of the total period of signal S2, say one-fourth of the total period.

The frequency of signals S1 and S2 is a function of the speed of rotation of optical encoder 12 and, thus, a function of the rate at which a cyclist is pedaling. Therefore, as the rotation of optical encoder 12 increases, the frequency of signals S1 and S2 also increases. Further, the amplitude of signals S1 and S2 depends on the supply voltage applied to optical encoder 12.

Figure 3A:
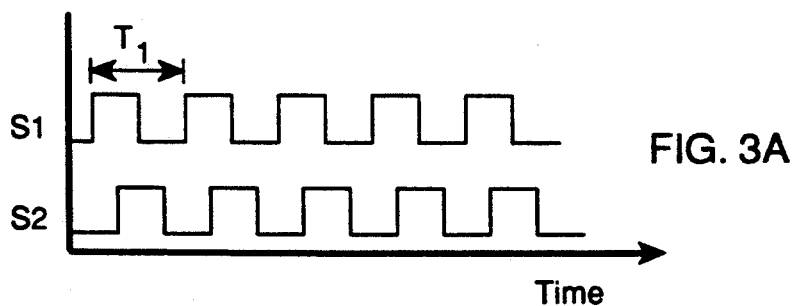
FIG. 3 is a pictorial diagram illustrating typical waveforms of an optical encoder in accordance with the present invention.

Referring to FIG. 3, three typical waveforms for signals S1 and S2 of optical encoder 12 are shown. In particular, FIG. 3A illustrates signals S1 and S2 having period $T_1$ whereby signal S1 leads signal S2 by a predetermined time. Hence, one can conclude that optical encoder 12 is rotating in a clockwise manner.

Figure 3B:
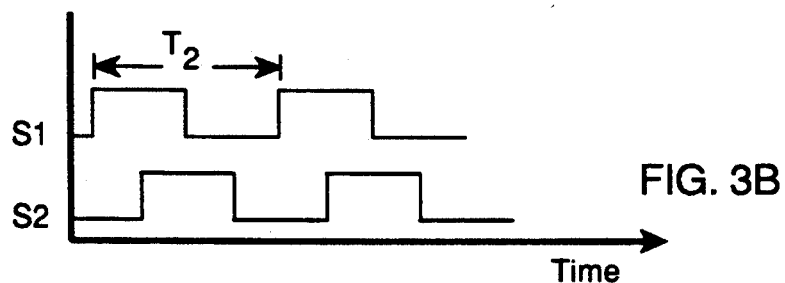

FIG. 3B illustrates signals S1 and S2 having period $T_2$ whereby period $T_2$ is substantially equal to twice the period $T_1$. Further, signal S1 leads signal S2 by a predetermined time. Hence, one can conclude from FIG. 3B that optical encoder 12 is rotating in a clockwise manner at substantially one-half the rate as optical encoder 12 was rotating with respect to FIG. 3A.

Figure 3C:
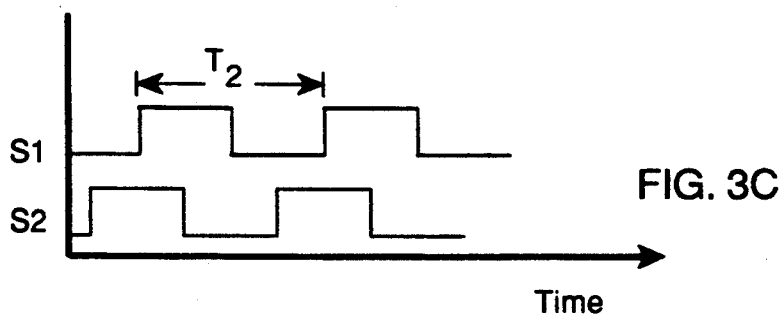

FIG. 3C illustrates signals S1 and S2 having period $T_2$. Further, signal S2 leads signal S1 by a predetermined time. Hence, one can conclude from FIG. 3C that optical encoder 12 is rotating in a counter-clockwise manner at the rate substantially equal to the rate that optical encoder 12 was rotating with respect to FIG. 3B.

One example of devices that can be utilized to perform the function of optical encoder 12 is the Hewlett Packard HRPG series of optical encoders, in particular, the HRPG-AS64#19C.

In summary, optical encoder 12 provides two signals of substantially equal period and frequency whereby the frequency of the two signals is proportional to the speed of rotation (angular velocity) of optical encoder 12. Further, the direction of rotation of optical encoder 12 can be determined by the phase relationship between the two signals.

A first function in computing unit 14 is performed by quadrature position decoder 18 which has first and second inputs for receiving signals S1 and S2 from optical encoder 12. Quadrature position decoder 18 detects a change in the state of optical encoder 12 (for example, optical encoder 12 has moved) and generates a pulse at output NUDATA to indicate that the change in state has occurred.

Further, position decoder 18 converts signals S1 and S2 to a position word along with a corresponding direction bit wherein the position word is provided at a plurality of outputs denoted by POS and the direction bit is provided at an output denoted by DIR. It is understood that outputs POS and DIR are updated with respect to a divided by N signal of clock signal CLK.

One example of a device that can be utilized to perform the function of quadrature position decoder 18 is the Hewlett Packard HCTL 2020 wherein a 16-bit position word is provided at an 8-bit output in two sequential bytes.

In summary, quadrature position decoder 18 provides a plurality of position words with corresponding direction bits each time quadrature position decoder 18 is clocked.

A second function in computing unit 14 is performed by angle quantizer 20 and is typically implemented in a microcontroller or microprocessor with timing circuitry. At least one microcontroller appropriate for this processing is the Motorola 68HC11.

Briefly, angle quantizer 20 quantizes the position of optical encoder 12 to a predetermined number of equally sized portions of a complete circle, for example, 36 portions. The time required for optical encoder 12 to pass through each portion of the circle is measured via a timer circuit within a microcontroller. Further, angle quantizer 20 determines the normalized angular velocity of optical encoder 12 by dividing the current time interval of a particular portion of a revolution into the shortest time interval of the previous revolution of optical encoder 12 thereby providing a normalized angular velocity for that portion of rotation of optical encoder 12. Thus, a shorter time interval for a particular portion of a circle corresponds to a faster angular velocity of optical encoder 12.

The resultant normalized angular velocity is then quantized to a predetermined number of levels, for example, 32. This quantized normalized angular velocity is provided at a plurality of outputs of angle quantizer 20, denoted by Q_NORM_VEL.

Along with the 8-bit word representing the quantized normalized angular velocity, angle quantizer 20 also provides a corresponding 8-bit position word which is provided at a plurality of outputs of angle quantizer 20, denoted by Q_POS. The 8-bit quantized normalized angular velocity word and the 8-bit position word comprise an output vector which is indicative of the angular velocity and position of crank arm 15 for a particular time interval. Further, the quantized normalized velocity value will be used to establish the length of the position line on display unit 16 as will be discussed hereinafter.

In particular and further explaining the operation of angle quantizer 20, initially choose a value N to generate fixed quantization angles of $(n \times \phi)$ where $n = 1, 2, \ldots N$ and $\phi = 360/N$.

The angular velocity over an $i^{th}$ time interval ($w_i$) can be expressed by a well known equation as shown in EQN.1.

$$w_i = \phi / t_i \quad (1)$$

where $t_i$ is the time measured to travel an angle of $\phi$.

Further, the maximum angular velocity ($w_{max}$) during the previous revolution of crank arm 15 can be calculated as shown in EQN.2.

$$w_{max} = \phi / t_{min} \quad (2)$$

where $t_{min}$ is the minimum time interval measured for all i time intervals of the previous revolution ($i = 1, 2, \ldots N$).

The normalized $i^{th}$ angular velocity ($w_{iN}$) can now be expressed as: $w_{iN} = w_i / w_{max}$. After a few simplifications, the normalized $i^{th}$ angular velocity ($w_{iN}$) can now be expressed as shown in EQN.3.

$$w_{iN} = t_{min} / t_i \quad (3)$$

The digital representation of $w_{iN}$ is then quantized to a predetermined number of levels, for example, 32. The result is then sent to display unit 16 via output Q_NORM_VEL.

As an example of quantizing to 32 levels, suppose that the 8-bit digital word of 10111100 represents the normalized $i^{th}$ interval angular velocity. Quantization to 32 levels means that only 5-bits can be significant and, thus, a 32 level quantization would result in three arithmetic shifts to the right. Therefore, the quantized digital representation of the normalized $i^{th}$ interval angular velocity would be: 00010111.

In summary, angle quantizer 20 provides a predetermined number of output vectors for each complete revolution of optical encoder 12 wherein each vector is composed of a normalized angular velocity component and a position component.

It is worth noting that angle quantizer 20 takes a predetermined number of angles of optical encoder 12 with their respective angular velocities and quantizes this data to a reasonable number of angles so that the data can be adequately displayed on display unit 16. However, it should be realized that if the resolution of optical encoder 12 was decreased by a predetermined factor, the position quantization function of angle quantizer 20 would not be needed.

Display unit 16 provides a display for each of the normalized angular velocity values and corresponding quantized position values within a complete revolution of optical encoder 12.

Briefly, display unit 16 activates an appropriate position display line on output display 24 according to the value of the quantized output vector. The length of the line is adjusted by energizing only some of the segments for the display line corresponding to the value of the normalized angular velocity component. Output display 24 is driven by display driver 22 which provides a plurality of arrow select outputs, for example 36, and a plurality of segment select outputs, for example 32. Further, display driver 22 activates a predetermined number of its segment select outputs along with only one of its arrow select outputs based on the logic states of the Q_POS and Q_NORM_VEL outputs received from the plurality of outputs of angle quantizer 20.

Figure 4:
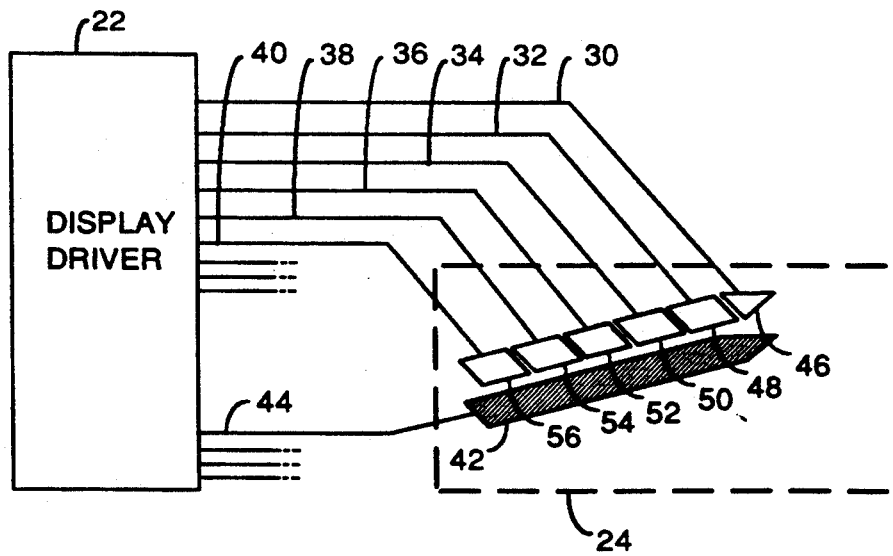
FIG. 4 is partial block diagram illustrating a portion of a display unit for the pedaling technique monitor of FIG. 1.

In particular, referring to FIG. 4, there is illustrated a portion of segment select output lines 30, 32, 34, 36, 38 and 40 from display driver 22 which are respectively coupled to display segments 46, 48, 50, 52, 54 and 56 of output display 24 for generating arrow 42. FIG. 4 utilizes a liquid crystal display (LCD). However, it should be realized that other display types such as light emitting diodes (LEDs) or a cathode ray tube (CRT) could also be used. Further, it must be realized that there is one arrow select output line corresponding to each arrow in output display 24, but that arrow select output line 44 corresponds to arrow 42. It is understood that arrow 42 comprises one of a plurality of arrows that are displayed on output display 24 wherein arrow 42 corresponds to a selected output vector of angle quantizer 20.

Display segment select output lines 30, 32, 34, 36, 38 and 40 are utilized to respectively energize display segments 46, 48, 50, 52, 54 and 56 to display the normalized angular velocity component corresponding to position component as represented by arrow 42.

In general, at higher angular velocites of optical encoder 12, more display segments of the corresponding arrow are activated. Further, at the highest angular velocity during the pedal revolution, all display segments for the corresponding arrow would be activated.

In summary, the length of an arrow, such as arrow 42 is proportional to the normalized angular velocity of optical encoder 12 (and crank arm 15 of FIG. 2), while the position of that arrow corresponds to the angular position of optical encoder 12 (and, consequently, to the position of crank arm 15 of FIG. 2).

It is understood that the output display 24 would have enough persistence to leave an arrow line displayed until the rotating line "comes around" again in the next revolution. Further, display unit 16 could be a conventional LCD display similar to that commonly used in existing bicycle computers wherein a portion of the display could display the cadence of the rider via numbers as is done in conventional cyclometers. In addition, other numbers such as distance, elapsed time, speed, etc., could also be displayed by providing another sensor on the front wheel of the bike. These numbers could also be displayed within a portion of the display.

The present invention indicates the smoothness of a rider's pedaling technique by displaying the relative angular crank arm speed as the rider rotates the pedals. Referring to FIG. 5, there is illustrated a number of typical displays associated with display unit 16 which indicate a rider's pedaling technique.

Figure 5A:
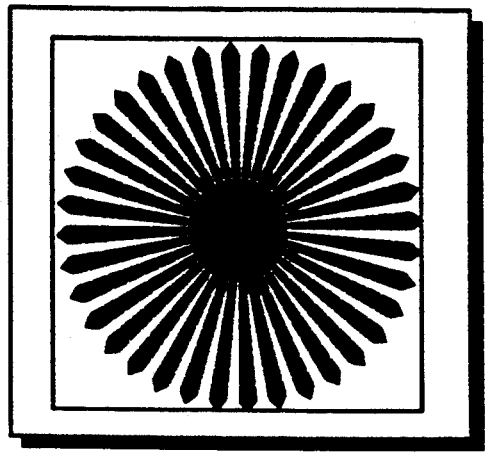
FIG. 5 is a pictorial diagram illustrating a typical output of a display unit in accordance with the present invention.

Excellent pedaling technique, as illustrated in FIG. 5A, implies a substantially constant pedaling speed throughout a pedal rotation and, thus, each output vector would be approximately equal in magnitude. As a result, excellent pedaling technique would appear on display unit 16 as a circle.

Figure 5B:
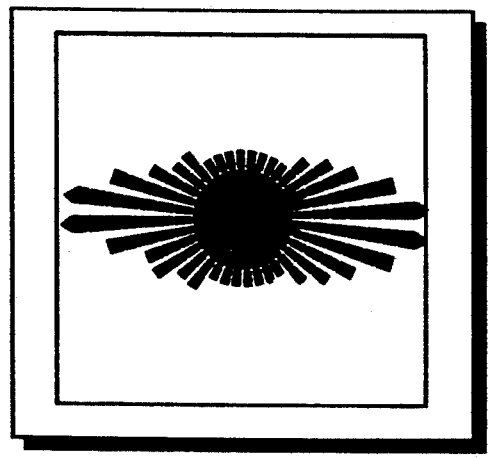

On the other hand, poor pedaling technique, as illustrated in FIG. 5B, implies that the rider is pushing the pedals faster during particular period of the pedal rotation and, thus, selected output vectors would have a magnitude substantially greater than the magnitude of others. As a result, poor pedaling technique would appear on display unit 16 as a flattened circle.

Figure 5C:
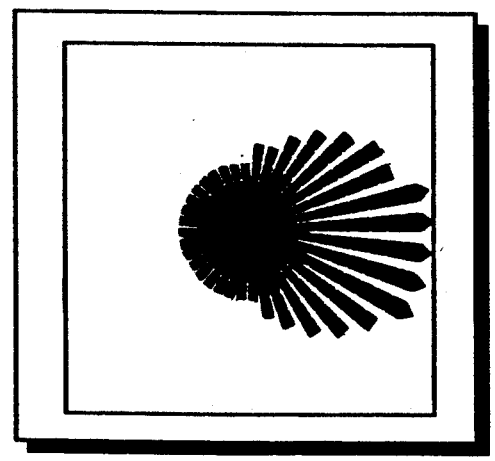

Finally, a rider with one leg weaker than the other implies that the one side of the circle generated by display unit 16 has a substantially larger radius than the other side of the circle as illustrated in FIG. 5C. This may be indicative of a rider with a sore or weak leg or a leg in rehabilitation after an injury or surgery.

It is understood that display unit 16 would be calibrated to show the position of the right foot (or left foot, if desired) which would move in a clockwise direction during normal pedaling. Further, backpedaling would be displayed as a line sweeping around in the counter-clockwise direction. For example, display unit 16 may be calibrated to a zero position by setting the pedal cranks vertically and pressing a calibration button (not shown) on computing unit 14.

By now it should be appreciated that there has been provided a novel circuit that successfully monitors a bicycle rider's pedaling technique.

While the invention has been described in conjunction with specific embodiments thereof, it is evident that that many alterations, modifications and variations will be apparent to those skilled in the art in light of the foregoing description. Accordingly, it is intended to embrace all such alterations, modifications and variations in the appended claims.

What is claimed is:

1. A circuit, comprising:
   an optical encoder for providing first and second output signals, said first and second output signals having a predetermined frequency which is a function of an angular velocity of said optical encoder;

a computing unit responsive to said first and second output signals of said optical encoder for providing first and second digital words, said first digital word being a function of a normalized angular velocity of said optical encoder, said second digital word being a function of an angular position of said optical encoder corresponding to said normalized angular velocity, said computing unit including:

a position decoder for digitally converting said first and second output signals of said optical encoder to a position word and a corresponding direction bit; and means for quantizing said position word and said corresponding direction bit of said position decoder to an output vector having first and second components, said first component corresponding to said first digital word, said second component corresponding to said second digital word, said means for quantizing providing a predetermined number of said output vectors for each revolution of said optical encoder; and a display unit responsive to said first and second digital words of said computing unit for displaying said normalized angular velocity of said optical encoder with respect to said corresponding angular position of said optical encoder.

2. The circuit according to claim 1 wherein said display unit includes:

a driver circuit responsive to said first and second digital words of said computing unit for activating a predetermined number of segment select output lines; and an output display responsive to said segment select output lines for displaying an arrow corresponding to said first and second digital words, said arrow having a length proportional to said normalized angular velocity and being positioned on said output display corresponding to said angular position.

3. In a bicycle computer for a bicycle, a pedaling technique monitor, comprising:

an optical encoder responsive to a crank arm of the bicycle for providing first and second output signal, said first and second signals having a predetermined frequency which is a function of an angular velocity of said crank arm;

a computing unit responsive to said first and second signals of said optical encoder for providing first and second digital words, said first digital word being a function of a normalized angular velocity of said crank arm, said second digital word being a function of an angular position of said crank arm corresponding to said normalized angular velocity, said computing unit including:

a position decoder for digitally converting said first and second output signals of said optical encoder to a position word and a corresponding direction bit; and means for quantizing said position word and said corresponding direction bit of said position decoder to an output vector having first and second components, said first component corresponding to said first digital word and said second component corresponding to said second digital word, said means for quantizing providing a predetermined number of said output vectors for each revolution of said crank arm; and a display unit responsive to said first and second digital words of said computing unit for displaying said normalized angular velocity of said crank arm with respect to said corresponding angular position of said crank arm.

4. The circuit according to claim 3 wherein said display unit includes:

a driver circuit responsive to said first and second digital words of said computing unit for activating a predetermined number of segment select output lines; and an output display responsive to said segment select output lines for displaying an arrow corresponding to said first and second digital words, said arrow having a length proportional to said normalized angular velocity of said crank arm and being positioned on said output display corresponding to said angular position of said crank arm.

5. A method for instantaneously monitoring an angular velocity and position of a rotating object, the method comprising the steps of:

(a) generating signals having a parameter proportional to the angular velocity of the rotating object;

(b) converting said signals into a position word and a corresponding direction bit;

(c) measuring a time for the rotating object to travel a predetermined angular distance;

(d) converting said position word and said corresponding direction bit to an output vector having first and second components, said first component representing a normalized angular velocity value of the rotating object corresponding to said time measured in step (c), said second component representing an angular position corresponding to said normalized angular velocity value; and (e) displaying said output vector.

6. The method according to claim 5 wherein step (e) includes the steps of:

activating a predetermined number of segment select outputs in response to said first component of said output vector;

activating one of a plurality of arrow select outputs corresponding to said second component of said output vector; and displaying an output arrow having a length corresponding to said first component of said output vector and a position corresponding to said second component of said output vector.

* * * * *